United States Patent [19]

Neuers

[11] 3,949,237

[45] Apr. 6, 1976

[54] POWER SUPPLY SYSTEM FOR SELECTIVELY PROPELLING A VEHICLE AND FOR DRIVING EQUIPMENT ON BOARD THE VEHICLE

[75] Inventor: Lucien Neuers, Paris, France

[73] Assignee: Thomson-CSF, Paris, France

[22] Filed: Mar. 4, 1974

[21] Appl. No.: 448,012

Related U.S. Application Data

[62] Division of Ser. No. 250,685, May 5, 1972, abandoned.

[30] Foreign Application Priority Data

May 7, 1971 France ............................. 71.16549

[52] U.S. Cl. ................................................ 290/40 B

[51] Int. Cl.² ............................................ H02P 9/04

[58] Field of Search .......... 123/127; 290/3, 7, 9, 17, 290/25, 34, 40, 45, 51; 307/9, 10

[56] References Cited

UNITED STATES PATENTS

| | | | |
|---|---|---|---|
| 2,655,602 | 10/1953 | Kuhn | 307/9 X |
| 3,310,045 | 3/1967 | Bartholomew | 123/127 |
| 3,626,197 | 12/1971 | Zanzarella et al. | 290/40 C |
| 3,660,671 | 5/1972 | Peterson | 290/40 X |
| 3,701,556 | 10/1972 | Richmond | 290/40 B |

*Primary Examiner*—Robert K. Schaefer
*Assistant Examiner*—W. E. Duncanson, Jr.
*Attorney, Agent, or Firm*—Edwin E. Greigg

[57] ABSTRACT

A vehicle which carries electric energy-consuming equipment on board is provided with a power supply system such as an internal combustion engine adapted to supply energy both for the propulsion of the vehicle and for the operation of the equipment on board. For this purpose, the combustion engine comprises a dual fuel feed system and a valve assembly which is formed of oppositely working valves to effect a mutually exclusive operation of the two fuel feed systems. One fuel feed system ensures a high engine output for the propulsion of the vehicle, while the other fuel feed system ensures a substantially constant, reduced engine output for supplying the equipment with energy.

2 Claims, 2 Drawing Figures

POWER SUPPLY SYSTEM FOR SELECTIVELY PROPELLING A VEHICLE AND FOR DRIVING EQUIPMENT ON BOARD THE VEHICLE

CROSS-REFERENCE TO RELATED APPLICATION

This application is a Division of applicant's copending application Ser. No. 250,685, filed on May 5, 1972 now abandoned.

BACKGROUND OF THE INVENTION

This invention relates to a power supply system for supplying energy to vehicles (such as land vehicles, vessels and the like) having energy consuming equipment (such as radars, gun turrets, or radio transmitters) on board.

In vehicles of the aforenoted type it is advantageous to use a sole energy source, usually an internal combustion engine, such as diesel engine or a carburetor type engine which furnishes both the energy required for the propulsion of the vehicle and for the operation of the equipment and the associated auxiliary apparatus on board. In this manner, the weight and costs of an additional engine are saved. But, on the other hand, difficulties are encountered in view of the fact that the characteristics of the energy supply for propelling the vehicle and for operating the equipment on board are often very different from one another as far as conrol and output are concerned. This is particularly the case in a vehicle which is equipped with radars or weapon systems. The energy requirement (electric energy) of this type of equipment is less than that for propelling the vehicle, but the requirements relating to the characteristics of voltage and frequency control are extremely stringent. The control of a combustion engine, however, is efficient and accurate only for an output and an operational range which are of the same order of magnitude as the average output and average operational range of the engine. In practice, the output necessary for driving the vehicle is far greater than that required for the equipment on board and thus, the difficulties to obtain a satisfactory control tend to preclude the use of a sole engine. Also, it is often necessary to utilize an auxiliary vehicle which carries an energy source for supplying with energy one or several vehicles having the aforenoted equipment on board.

As it has been mentioned before, one of the difficulties in providing a sole engine that supplies the two types of energies resides in the inaccuracy of the control of the engine for substantially different output ranges. In general, in any type of engine, the specifications of the different engine accessories are determined for a sole output: the output at which the engine is to operate under normal conditions. Thus, in a combustion engine, the caliber of the engine accessories, the fuel feed input, the lubrication, the cooling system etc., are all matched with the same said engine output. An imbalance in the matching of one of these accessories, for example, the cooling system, causes not only a drop in the engine output down to the smallest output for which the accessory in question has been designed, but also, the accessory will operate in a defective manner at this reduced output. In particular, there will be experienced a lack of flexibility and stability of operation.

OBJECT AND SUMMARY OF THE INVENTION

It is an object of the invention to provide an improved power supply system such as an internal combustion engine for the supply of energy for both the propulsion of the vehicle and the equipment on board.

Numerous tests conducted by applicant have shown that in an engine designed for a given output it was possible to obtain an engine operation of satisfactory stability and flexibility at a reduced output which could be as low as four-fifths of the normal output by providing the engine with a fuel feed system that is adapted to such a reduced output. In case of a diesel engine, this fuel feed system comprises the fuel pump associated with the injectors and in explosion-type engines, it comprises the intake conduit means matched with the carburetor.

According to one feature of the invention, the combustion engine, which is to supply selectively an output of $n$ different levels includes $n$ fuel feed systems that correspond respectively to the $n$ output levels and may be activated and controlled independently from one another.

In order to obtain a satisfactory operation of the engine with all of the $n$ feed systems, it has been found that it was necessary to effect a complete substitution; stated differently, the inoperative $n$-1 systems had to be placed entirely outside the operational circuit. Thus, the systems were not allowed either to cooperate or to interact. In explosion-type engines, this implies the necessity of using $n$ fuel lines, each provided with a separate carburetor of appropriate dimensions. It is, however, not necessary that the intake valves be separate also. Thus, the cylinder heads are provided with fuel lines associated with the highest output, while the feed conduits corresponding to the lower outputs are branched off the latter.

According to another feature of the invention, the air intake tubes are mounted parallel to one another and are provided with their respective carburetors. The air intake tubes merge downstream of the carburetors.

If $n = 2$, the permutation of the two systems is effected by disconnecting from the circuit one or the other. In case the conduits are mounted in the aforenoted manner, a disconnection is effected simply by blocking the conduit to be temporarily eliminated. Such a blocking has to be as perfect as possible, otherwise the stability of control of the other system will be disturbed. In practice, it is very difficult to effect a sufficient blocking and in order to diminish the influence of run-away effects in the operation of the engine, the fuel feed is also cut off.

It is a desideratum to pass from one output range to another with smooth transition and without the necessity to stop the engine. Thus, the two manoeuvres of blocking one conduit and opening the other should be simultaneous and controlled by a single manipulation.

According to another feature of the invention, the device for switching from one system to another is formed by shutoff valves closing the intake conduits downstream of the carburetors and valves which block the passage of the fuel. These blocking means and valves are operated in an opposite sense simultaneously for the two systems through a sole control means.

The equipment on board should also be capable of being supplied by energy in a simple and rapid manner from an external source which, for example, may be carried by a separate vehicle of the same type or specially designed for this purpose. Also, the equipment on board and the entirety of the vehicle require the operation of a certain number of auxiliary installations independently of the fact that the equipment on board is used or not, or whether the vehicle is in motion or is stationary. Such auxiliary installations are, for example, the ventilation and air conditioning of working spaces and the air conditioning of electronic equipment. These auxiliary installations should be capable of being supplied with energy in the three following instances: during the use of the combustion engine for driving the vehicle; during the use of the engine for supplying the equipment on board with energy; and during energy supply for the equipment on board by means of an energy source located externally of the vehicle. It is to be noted that the auxiliary installations do not require a particularly controlled electric energy supply. The change-over from one type of supply to another should be effected in a minimum amount of time with a minimum of manipulations.

According to another feature of the invention, the combustion engine mechanically drives, by the intermediary of a free wheel, a portion of the auxiliary installations associated with the equipment on board and to be supplied with energy, regardless of the modes of utilization of the engine and the energy supply of the equipment on board. The combustion engine also drives an electric motor which is in a de-energized condition when the combustion engine is in operation and is supplied in parallel with the other equipment on board when the supply of electric energy is taken from a source outside the vehicle.

BRIEF DESCRIPTION OF THE DRAWINGS

The invention will be better understood as well as further objects and advantages become more apparent from the ensuing detailed specification of a preferred, although exemplary embodiment of the invention taken in conjunction with the two figures which schematically illustrate.

DESCRIPTION OF THE PREFERRED EMBODIMENT

Figure 1:
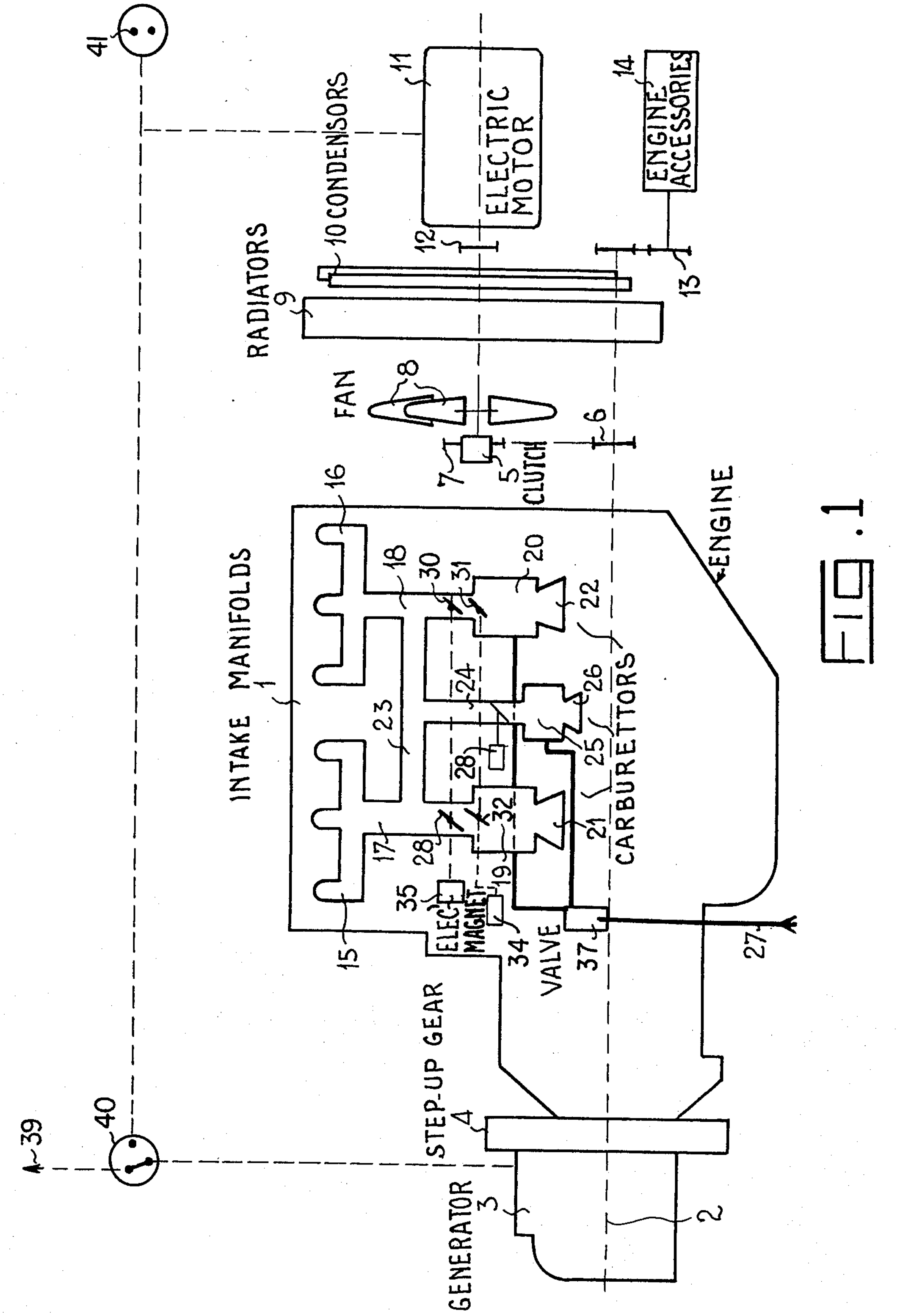
FIG. 1 schematically illustrates an energy supply assembly according to the present invention.

In FIG. 1, there is shown a conventional internal combustion engine 1 which, in this case, is a six-cylinder gasoline engine of 134 KW. The engine shaft is indicated with the broken line 2. There is further illustrated an AC generator 3 driven by the engine through a step-up gear 4. At the other side of the engine, there is disposed a pinion 6 keyed to the engine shaft and meshing with a pinion 7 which, in turn, is keyed to the shaft of the fan 8 and an electric motor 11 by the intermediary of a free wheel 5. The fan 8 ensures the circulation of air through the radiators 9 of the engine and the two condensors 10 of the coolant circuits. A gear 12 keyed to the shaft of the electric motor 11 drives a compressor (not shown) of the cooling system. The other engine accessories such as charging alternators, energizers, hydraulic pump, etc. are driven by the engine shaft as indicated at 13 and 14.

Figure 2:
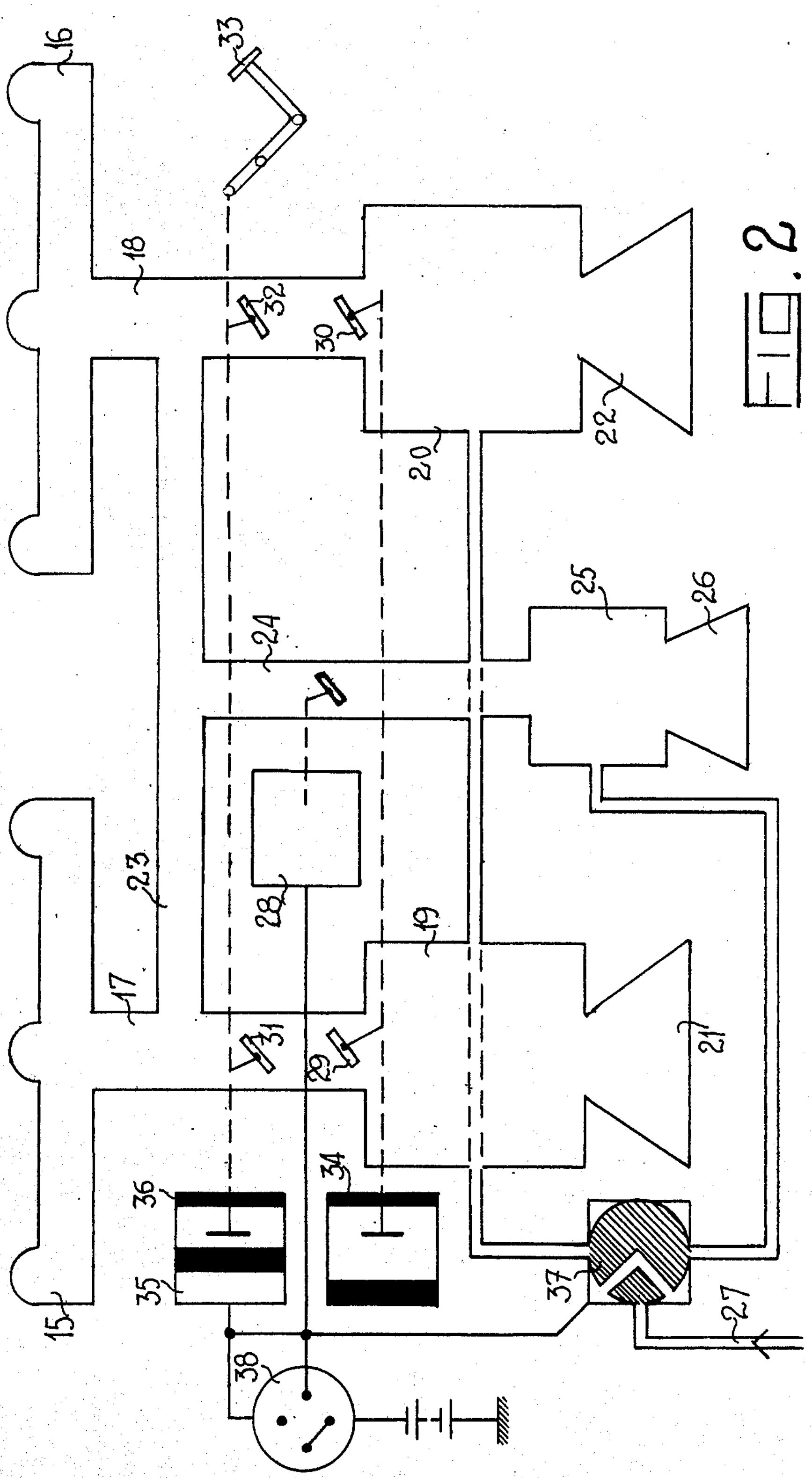
FIG. 2 is a partial view of an enlarged scale of certan details of assembly shown in FIG. 1.

The dual system for supplying a fuel mixture to the internal combustion engine comprises two intake manifolds 15 and 16, each serving three cylinders of the engine. The intake manifolds 15 and 16 are connected by means of tubes 17 and 18 to two respective power carburetors 19 and 20 provided with air intake openings 21 and 22, respectively. The conduits 17 and 18 are in communication with one another by means of a transversal conduit 23 which, in turn, communicates by means of a conduit 24 with the low-output carburetor 25 having an air intake opening 26. The diameter of the conduits 17 and 18, on the one hand and the conduits 23 and 24, on the other hand, are designed as a function of the outputs required of the engine. There is further provided a fuel line 27 which supplies the three carburetors 19, 20 and 25 with gasoline. The control components proper associated with the carburetors, such as injection pmps and regulators, etc., are not shown except for the regulator 28. The conduits 17 and 18 are provided, downstream of their respective carburetors 19, 20 and upstream of the mouth of the transversal conduit 23, with shutoff valves 29 and 30, respectively. These valves are maintained either in an open or in a closed position by means of an electromagnet 35. Thus, these valves do not assume any intermediate positions. The angular position of the butterfly valves 31 and 32 of the carburetors 20 and 19, respectively, is controlled by an accelerator pedal 33 (FIG. 2). An electromagnet 34 causes the butterfly valves 31 and 32 to assume a fixed predetermined position 36 (FIG. 2). A two-way solenoid valve 37 regulates the fuel line 27 to the three caburetors 19, 20 or 25. The solenoid valve 37 is coupled to the electromagnets 34 and 35 (FIG. 2) in such a manner as to ensure an operation as follows:

When the combustion engine delivers energy for driving the vehicle, it is supplied with a fuel mixture by the carburetors 19 and 20. For this purpose the shut-off valves 29 and 30 as well as the fuel inlets for carburetors 19 and 20 are open. The solenoid valve 37 maintains the fuel line for the carburetor 25 closed. The output of the carburetors 19 and 20 is controlled by the accelerator pedal 33; the maximum speed is limited by mechanical regulator means.

The engine having an output of 134 KW at 3600 rpm's drives the electric generator 3 at a speed in the order of 9200 rpm's through a planetary step-up gear 4. The energy supplied by this generator is utilized in the electric propulsion motors. The combustion engine drives by means of a secondary shaft and with the intermediary of a free wheel 5, the accessories necessary for the operation of the engine and for the supply of the different auxiliary apparatus which are designed to operate independently of the motion of the vehicle, such as ventilation, air conditioning, etc.

For utilizing the system according to the invention, the combustion engine has to be started or it should continue to run when the vehicle comes to a stop. When the vehicle is stopped and it is desired to operate the auxiliary installations, the button 38 is actuated. Upon pressing the actuating button 38, the following events take place (referring to FIG. 2):

a. the electromagnet 34 is energized whereby the butterfly valves 31 and 32 of the carburetors 20 and 19 are so set that an approximate engine speed of 2400 rpm's results;

b. with a slight delay with respect to (a), the electromagnet 35 is energized, whereby the shut-off valves 29. 30 are closed and the solenoid valve 37 is set to block the fuel supply to the carburetors 19, 20 and to open simultaneously the fuel supply to the carburetor 25, the carburetors 19 and 20 are thus placed outside of the loop during the time that the carburetor 25 is in operation;

c. simultaneously with (8b) the hydro-electric regulator 28 is energized. From that moment on, the engine rotates at 2360 rpm's and delivers a maximum output of 34 KW which is equivalent to a current frequency supplied by a generator of 400 Hz. The regulator 288 is of a known type and is associated with the carburetor 25 maintaining this frequency at an accurate level with ±0.5% tolerance. The regulator 28 is therefore caused to function when the engine already has a speed (2400 rpm) very close to the set speed (2360). In this way engine oscillation is avoided.

The device for an external energy supply for the equipment on board the vehicle is schematically shown in the FIG. 1. The supply conductors 39 of the equipment are connected by a permutator 40 to the AC generator 3 on the one hand, and to an external current intake 41 on the other hand. The electric motor 11 which drives the different accessories is directly supplied by electric energy through the external electric intake 41.

It is seen that for switching from the energy supplied by the combustion engine to an external supply all that has to be done after energizing the intake 41 is to throw the permutator 40 into its position of external supply. No other manipulation has to be effected since the same accessory 8 which has been mechanically driven by the combustion engine is now driven by the electric motor 11; the free wheel 5 automatically ensures a disconnection of the combustion engine from its accessories. Under these conditions, it is even possible to switch from the engine-supplied energy for the equipment on board to an external supply without interruption other than that caused by the throwing of the permutator 40.

What is claimed is:

1. A power supply system for supplying power to separately propel a vehicle and drive equipment on board said vehicle, the system comprising:

a. an internal combustion engine having a fuel intake manifold;

b. an electric generator driven by said engine for energizing separately the propelling of said vehicle and said equipment;

c. two independent fuel supply systems, each having:

i. at least one carburetor;

ii. conduit means connecting the carburetor to the intake manifold of said engine; and iii. control means for the controlling the fuel supply through said conduit means; with iv. said control means of one of said fuel supply systems including a pair of valves spaced in series within its respective conduit means and a pair of electromagnets one for each of said valves for controlling the relative position of its respective valve; and with v. each of said valves having two relative positions which for one of said valves corresponds to an open position and a closed position and for the other of said valves corresponds to an open position and a position which results in setting the engine at a speed preparatory to supplying power to said equipment;

d. a solenoid valve for controlling the fuel supplied to the carburetors of said fuel supply systems; and e. an electrical switch connected to said electromagnets and to said solenoid valve for selectively energizing either of said electromagnets and for energizing said solenoid valve to cause fuel to flow to either of the carburetors of said fuel supply systems.

2. A power supply system for supplying power to separately propel a vehicle and drive equipment on board said vehicle, the system comprising:

a. an internal combustion engine supplying *n* output levels;

b. *n* fuel feed systems each corresponding to a different one of the *n* output levels;

c. means for activating and controlling any selected one of said fuel feed systems with the exclusion of the others;

d. a free-wheeling clutch through which power is supplied from the engine to auxiliary installations associated with said engine, said auxiliary installations including an electric motor;

e. an electric generator driven by said engine;

f. an external electric intake connected to said electric motor and to an electric permutator; and g. an electric permutator connected to said equipment, to said generator, and to said electric motor with said external electric intake, said equipment with said electric motor being supplied from said external electric intake when said permutator is correspondingly set to operate said equipment from said external intake.

* * * * *